United States Patent
Sasaki

(10) Patent No.: US 10,431,846 B2
(45) Date of Patent: Oct. 1, 2019

(54) ENERGY STORAGE DEVICE

(71) Applicant: GS Yuasa International Ltd., Kyoto-shi (JP)

(72) Inventor: Takeshi Sasaki, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 106 days.

(21) Appl. No.: 14/716,687

(22) Filed: May 19, 2015

(65) Prior Publication Data

US 2015/0340726 A1 Nov. 26, 2015

(30) Foreign Application Priority Data

May 22, 2014 (JP) .................. 2014-106146

(51) Int. Cl.
*H01M 10/04* (2006.01)
*H01M 4/70* (2006.01)
*H01M 10/0587* (2010.01)
*H01M 2/26* (2006.01)
(Continued)

(52) U.S. Cl.
CPC ......... *H01M 10/0431* (2013.01); *H01M 4/70* (2013.01); *H01M 2/263* (2013.01); *H01M 10/0525* (2013.01); *H01M 10/0587* (2013.01); *H01M 2004/025* (2013.01)

(58) Field of Classification Search
CPC ....... H01M 2004/025; H01M 10/0431; H01M 10/045; H01M 10/0587; H01M 4/70; H01M 4/75; H01M 2/02–0295; H01M 10/0413–049
See application file for complete search history.

(56) References Cited

U.S. PATENT DOCUMENTS

2005/0271933 A1* 12/2005 Matsumoto ............. H01M 2/22
429/127
2010/0143787 A1* 6/2010 Jung ..................... H01M 2/021
429/162
(Continued)

FOREIGN PATENT DOCUMENTS

JP 2001-203001 A 7/2001
JP 2013-229127 A 11/2013
(Continued)

OTHER PUBLICATIONS

Machine translation of JP2001-203001.*
Machine translation of JP2013-229127A.*

*Primary Examiner* — Eric R Smith
(74) *Attorney, Agent, or Firm* — McGinn IP Law Group, PLLC

(57) ABSTRACT

An energy storage device includes an electrode assembly that includes a sheet-like first electrode and a sheet-like second electrode, the first electrode and the second electrode being alternately layered. Each of the first electrode and the second electrode includes a sheet-like current collecting substrate, and the current collecting substrate of the first electrode is bent toward one side in a layered direction in at least a part of an end portion of the first electrode. The electrode assembly also includes an extension portion formed in such a manner that the current collecting substrate of the second electrode extends outward more than the end portion of the first electrode.

18 Claims, 8 Drawing Sheets

(51) Int. Cl.
*H01M 10/0525* (2010.01)
*H01M 4/02* (2006.01)

(56) References Cited

U.S. PATENT DOCUMENTS

| | | | | |
|---|---|---|---|---|
| 2011/0052976 A1* | 3/2011 | Ishii | ............... | H01M 2/22 429/178 |
| 2011/0135981 A1 | 6/2011 | Sato et al. | | |
| 2011/0293996 A1* | 12/2011 | Daidoji | ............... | H01M 2/22 429/158 |
| 2012/0032644 A1* | 2/2012 | Hagiwara | ............... | H01M 10/0525 320/134 |
| 2015/0288026 A1* | 10/2015 | Yamamoto | ............... | H01M 10/0585 429/179 |

FOREIGN PATENT DOCUMENTS

| | | | | |
|---|---|---|---|---|
| JP | WO 2014050988 A1 * | 4/2014 | ......... | H01M 10/0585 |
| WO | WO 2011/016243 A1 | 2/2011 | | |

* cited by examiner

ENERGY STORAGE DEVICE

CROSS-REFERENCE TO RELATED APPLICATIONS

This application claims the benefit of Japanese patent application No. 2014-106146, filed on May 22, 2014, which is incorporated by reference.

FIELD

The present invention relates to an energy storage device.

BACKGROUND

Conventionally, an energy storage device is known which is provided with an electrode assembly including, for example, a sheet-like positive electrode and a sheet-like negative electrode.

In this type of energy storage device, for example, each of the positive electrode and the negative electrode includes a sheet-like current collecting substrate and an active material layer disposed on at least one side of the current collecting substrate. Then, the electrode assembly is formed by, for example, winding of the positive electrode and the negative electrode facing each other.

In this electrode assembly, for example, the positive electrode and the negative electrode are layered by the winding and the positive electrode and the negative electrode are disposed so as to be alternately arranged in a layered direction. In addition, for example, the electrode assembly includes extension portions which are respectively formed on both sides in an axial direction of a winding axis (width direction of the sheet-like electrode) in such a manner that the current collecting substrate of the positive electrode and the current collecting substrate of the negative electrode extend outward more than an active material layer in a direction opposite to each other.

In such an energy storage device, for example, each of the extension portions includes a bundle portion formed by bundling the extended current collecting substrates of the electrodes at a leading end in an extending direction, and the bundle portion is disposed at a central portion of a thickness of the extension portion in the layered direction.

Then, the above energy storage device is configured such that the bundle portion acts as an electric path at charge-discharge of the energy storage device.

For example, WO 2011/016243 A proposes the kind of energy storage device provided with a negative electrode formed by cutting of a wide negative electrode plate (an original negative electrode plate) including a sheet-like current collecting substrate.

In the energy storage device disclosed in WO 2011/016243 A, the negative electrode is formed in such a manner that the wide electrode plate (wide negative electrode plate) including the sheet-like current collecting substrate and an active material layer disposed on at least one side of the current collecting substrate is cut in a thickness direction. Accordingly, at least a part of the end portion of the negative electrode includes a bent end portion at which the current collecting substrate is bent by cutting force.

The bent end portion of the negative electrode is formed by the cutting force applied to one side in the thickness direction during the cutting of the wide negative electrode plate. Thus, at the bent end portion of the negative electrode, the current collecting substrate is bent toward one side in the thickness direction of the negative electrode.

In this way, the energy storage device disclosed in WO 2011/016243 A is provided with the negative electrode of which the current collecting substrate is bent at the bent end portion. The energy storage device disclosed in WO 2011/016243 A has excellent manufacturing efficiency in that a plurality of negative electrodes are produced by the cutting of the wide negative electrode plate, as compared to the energy storage device provided with the negative electrode produced one by one.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

A short circuit between the positive electrode and the negative electrode may occur in the above-mentioned energy storage device.

For example, when the electrode assembly includes a separator between the positive electrode and the negative electrode, the separator may be cut, torn, or split by the bent end portion of the current collecting substrate of the negative electrode.

In addition, for example, when the bundle portion of the current collecting substrate of the positive electrode extending more than the bent end portion of the negative electrode is disposed on one side of the winding axis of the electrode assembly and the current collecting substrate at the bent end portion of the negative electrode is bent toward the adjacent positive electrode, the bent end portion of the negative electrode may contact with the extended current collecting substrate of the positive electrode. When the current collecting substrate of the negative electrode contacts with the current collecting substrate of the positive electrode, the short circuit between the positive electrode and the negative electrode occurs.

In this way, in the energy storage device configured in such a manner that the positive electrode and the negative electrode are alternately arranged in the thickness direction, when one of the positive electrode and the negative electrode has the bent end portion formed by the cutting of the wide electrode plate and the other of the positive electrode and the negative electrode includes the bundle portion formed by bundling the current collecting substrate extending outward more than the bent end portion, the short circuit between the positive electrode and the negative electrode is not sufficiently suppressed.

An object of present invention is to provide an energy storage device configured such that the layered positive electrode and negative electrode are alternately arranged in the thickness direction and the short circuit between the positive electrode and the negative electrode is suppressed even though the current collecting substrate of at least one of the positive electrode and the negative electrode is bent toward at least a part of the end portion and the current collecting substrate of the other electrode which extend outward more than the end portion is bundled.

An energy storage device according to an aspect of the present invention comprises: an electrode assembly that includes a sheet-like first electrode and a sheet-like second electrode, the first electrode and the second electrode being alternately layered, wherein each of the first electrode and the second electrode includes a sheet-like current collecting substrate, the current collecting substrate of the first electrode is bent toward one side in a layered direction in at least a part of an end portion of the first electrode, the electrode assembly includes an extension portion formed in such a manner that the current collecting substrate of the second electrode extends outward more than the end portion of the first electrode, the extension portion includes a bundle portion formed by bundling the current collecting substrate at a leading end side in an extending direction of the extension portion, and a central position in the layered direction of the bundle portion is shifted from a center in the layered direction of the extension portion toward the one side in the layered direction.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
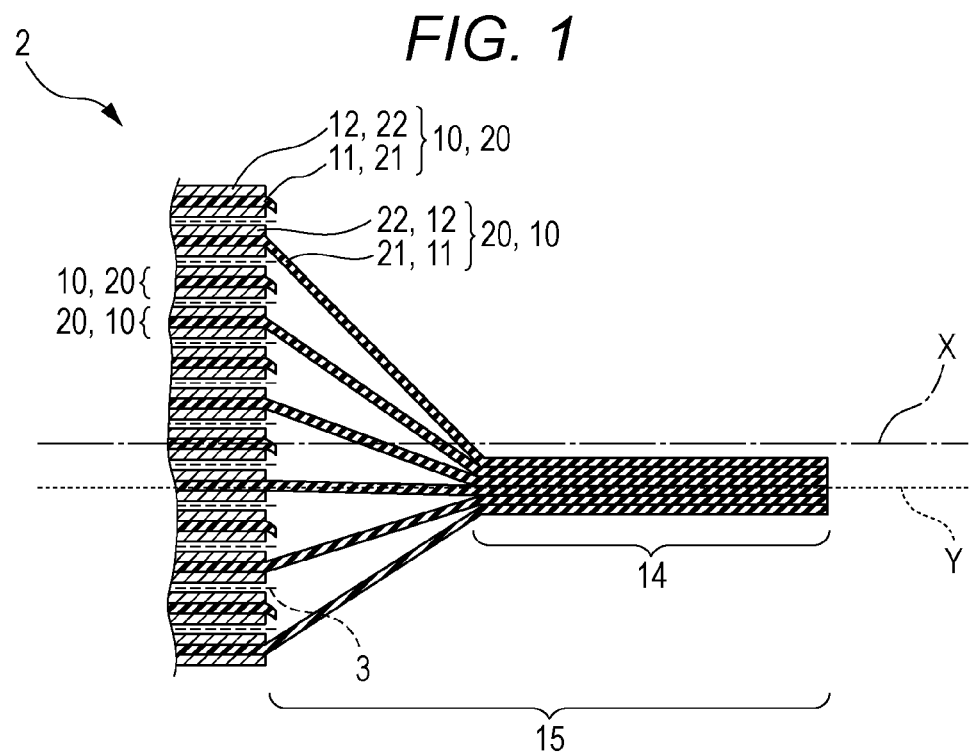
FIG. 1 is a schematic diagram schematically illustrating a part of a cross-section of a bundle portion and a bent end portion in an example of an electrode assembly.

An energy storage device according to an aspect of the present invention comprises: an electrode assembly that includes a sheet-like first electrode and a sheet-like second electrode, the first electrode and the second electrode being alternately layered, wherein each of the first electrode and the second electrode includes a sheet-like current collecting substrate, the current collecting substrate of the first electrode is bent toward one side in a layered direction in at least a part of an end portion of the first electrode, the electrode assembly includes an extension portion formed in such a manner that the current collecting substrate of the second electrode extends outward more than the end portion of the first electrode, the extension portion includes a bundle portion formed by bundling the current collecting substrate at a leading end side in an extending direction of the extension portion, and a central position in the layered direction of the bundle portion is shifted from a center in the layered direction of the extension portion toward the one side in the layered direction.

In the energy storage device having the above configuration, the first electrode (for example, one of the positive electrode and the negative electrode) and the second electrode (for example, the other of the positive electrode and the negative electrode) are disposed to be alternately arranged in the layered direction in the electrode assembly. In addition, the end portion of the first electrode is arranged in the layered direction, and the current collecting substrate includes the same bending direction at the end portion.

The electrode assembly includes the extension portion formed in such a manner that the current collecting substrate of the second electrode extends outward more than the end portion, and the extension portion has the bundle portion formed by bundling the current collecting substrates at the leading end side in the extending direction.

The central position in the layered direction of the bundle portion is shifted from the center in the layered direction of the extension portion toward the one side in the layered direction. That is, the position of the bundle portion formed by bundling the current collecting substrate of the second is biased toward the one side from the center of the thickness of the extension portion, and the biased direction is a direction in which the current collecting substrate of the first electrode is bent at the end.

Accordingly, since the bundle portion of the second electrode is biased toward the bending direction of the current collecting substrate, the extension portion (current collecting substrate) of the second electrode and the end portion of the first electrode are suppressed from approaching each other.

Therefore, in the above-described energy storage device configured such that the layered positive electrode and negative electrode are alternately arranged in the thickness direction, the short circuit between the positive electrode and the negative electrode is suppressed even though the current collecting substrate of at least one of the positive electrodes and the negative electrodes are bent toward at least a part of the end portion and the current collecting substrates of the other electrodes which extends outward more than the end portion are bundled.

In another aspect of the energy storage device, the electrode assembly may be formed by winding the first and second electrodes.

In still another aspect of the energy storage device, in a cross sectional view, the first electrode may include first bent end portions, at which the current collecting substrate of the first electrode may be bent in the layered direction, in at least a part of the end portion of the first electrode, in a cross sectional view, the second electrode may include second bent end portions, at which the current collecting substrate of the second electrode may be bent in the layered direction, in at least a part of the end portion of the second electrode, the first bent end portions may be disposed to align the bending direction of the current collecting substrate of the first electrode, at one side of the winding axis of the electrode assembly, the second bent end portions may be disposed to align the bending direction of the current collecting substrate of the second electrode, at the other side of the winding axis of the electrode assembly, in a cross sectional view, the electrode assembly may include first extension portions formed in such a manner that the current collecting substrate of the first electrode extends outward more than the second bent end portions at the other side of the winding axis and in a cross sectional view, the electrode assembly may include second extension portions formed in such a manner that the current collecting substrate of the second electrode extends outward more than the first bent end portions at the one side of the winding axis, the first and second extension portions may include first and second bundle portions formed by bundling the current collecting substrates at the leading end sides in the extending direction, respectively, the first bundle portion may be shifted in the bending direction of the second bent end portions from a center of the first extension portions in the layered direction, and the second bundle portion may be shifted in the bending direction of the first bent end portions from a center of the second extension portions in the layered direction.

In still another aspect of the energy storage device, the first bent end portions may be disposed to align the bending direction of the current collecting substrate of the first electrode toward the winding axis, the second bent end portions may be disposed to align the bending direction of the current collecting substrate of the second electrode toward the winding axis, the first bundle portions may be shifted toward the winding axis from the center in the layered direction of the first extension portions, and the second bundle portions may be shifted toward the winding axis from the center in the layered direction of the second extension portions.

According to the aspects of the present invention, the energy storage device is configured such that the layered first (for example, one of the positive electrode and the negative electrode) and the second (for example, the other of the positive electrode and the negative electrode) are alternately arranged in the thickness direction and has an effect of suppressing the short circuit between the first electrode and the second electrode even though the current collecting substrates of at least the first electrode is bent toward at least a part of the end portion and the current collecting substrates of the second electrode which extends outward more than the end portion is bundled.

An energy storage device according to an embodiment of the present invention will be described below with reference to the drawings. An example of the energy storage device according to the embodiment includes a primary battery, a secondary battery, a capacitor, etc. In the present embodiment, a chargeable/dischargeable secondary battery will be described as an example of the energy storage device.

An energy storage device 1 according to the present embodiment includes: an electrode assembly 2 that includes sheet-like positive electrodes 10 and sheet-like negative electrodes 20 and is configured such that the positive electrodes 10 and the negative electrode 20 are alternately and repeatedly layered, wherein the positive electrodes 10 and the negative electrodes 20 have sheet-like current collecting substrates, respectively; the current collecting substrates are bent toward one side in a layered direction in at least a part of end portions of at least one of the positive electrodes 10 and the negative electrodes 20; in the electrode assembly 2, the end portions of one of the positive electrodes 10 and the negative electrodes 20 are arranged in the layered direction, and the current collecting substrates have the same bending direction at the end portions; the electrode assembly 2 includes an extension portion 15 formed in such a manner that current collecting substrates of the other of the positive electrodes 10 and the negative electrodes 20 extend outward more than the end portions of one of the positive electrodes 10 and the negative electrodes 20; the extension portion 15 has a bundle portion 14 formed by bundling the current collecting substrates at a leading end side in the extending direction; and a central position in the layered direction of the bundle portion 14 is on the bending direction of the current collecting substrate from a center in the layered direction of the extension portion 15.

Specifically, as illustrated in FIGS. 1 to 6, an energy storage device 1 according to the present embodiment is provided with: an electrode assembly 2 including sheet-like positive electrodes 10 and sheet-like negative electrodes 20; wherein each of the positive electrode 10 and the negative electrode 20 has a sheet-like current collecting substrate; at least one of the positive electrode 10 and the negative electrode 20 includes a bent end portion 13 which is formed by cutting the wide electrode plate including the sheet-like current collecting substrate in a thickness direction and the bent end portion 13 is configured to be bent toward one side of the bent end portion 13 in the thickness direction; in the electrode assembly 2, the positive electrode 10 and the negative electrode 20 are disposed to be alternately and repeatedly arranged in the thickness direction and the bent end portion 13 on one of the positive electrode 10 and the negative electrode 20 is disposed to align a bending direction of the current collecting substrate; the electrode assembly 2 includes an extension portion 15 formed in such a manner that the current collecting substrate of the other of the positive electrode 10 and the negative electrode 20 extends outward more than the bent end portion 13; the extension portion 15 has a bundle portion 14 formed by bundling the current collecting substrates at a leading end side in the extending direction; and the bundle portion 14 is disposed in the bending direction of the current collecting substrate at the bent end portion 13 from a center of a thickness of the extension portion 15.

In the energy storage device 1 according to the present embodiment, at least one of the positive electrode 10 and the negative electrode 20 includes the bent end portion 13, and preferably, both of the positive electrode 10 and the negative electrode 20 include the bent end portion 13.

Specifically, in the energy storage device 1 according to the present embodiment, for example, the electrode assembly 2 is formed by winding of the positive electrode 10 and the negative electrode 20 facing each other, and the positive electrode 10 and the negative electrode 20 are alternately and repeatedly arranged in the thickness direction by the winding. Both of the positive electrode 10 and the negative electrode 20 each include the bent end portion 13, the bent end portion 13 of the positive electrode 10 is disposed on one side of a winding axis of the electrode assembly 2 (one side in the width direction of the electrodes), the bent end portion 13 of the negative electrode 20 is disposed on the other side of the winding axis of the electrode assembly 2 (the other side in the width direction of the electrodes). The bent end portion 13 of the positive electrode 10 is disposed to align the bending direction of the current collecting substrate, at one side of the winding axis of the electrode assembly 2, and the bent end portion 13 of the negative electrode 20 is disposed to align the bending direction of the current collecting substrate, at the other side of the winding axis of the electrode assembly 2. The electrode assembly 2 includes the extension portion 15 formed in such a manner that the current collecting substrate of the negative electrode 20 extends outward more than the bent end portion 13 of the positive electrode 10 at one side of the winding axis. The electrode assembly 2 includes the extension portion 15 formed in such a manner that the current collecting substrate of the positive electrode 10 extends outward more than the bent end portion 13 of the negative electrode 20 at the other side of the winding axis. Each of the extension portions 15 includes the bundle portion 14 formed by bundling the current collecting substrates at a leading end side in the extending direction, and each of the bundle portions 14 is disposed in the bending direction of the current collecting substrate at the bent end portion 13 from the center of the thickness of each of the extension portions 15.

The energy storage device 1 according to the present embodiment is a nonaqueous electrolyte secondary battery. Specifically, an example of the energy storage device 1 according to the present embodiment may include a nonaqueous electrolyte secondary battery 1 (lithium ion secondary battery) illustrated in FIGS. 7 and 14.

This type of energy storage device supplies electric energy. The energy storage device is used in single or multiple forms. Specifically, the energy storage device is used in a single form when a required output and a required voltage are small. Meanwhile, the energy storage device is used in an energy storage apparatus in combination with other energy storage devices when at least one of the required output and the required voltage is large. In the energy storage apparatus, the energy storage device to be used in the energy storage apparatus supplies electric energy.

As illustrated in FIGS. 2 to 6, the energy storage device 1 according to the present embodiment is provided with the electrode assembly 2 formed by the winding of the sheet-like positive electrode 10 and the sheet-like negative electrode 20. That is, the positive electrode 10 and the negative electrode 20 of the electrode assembly 2 are disposed so as to be alternately and repeatedly arranged in the thickness direction by the winding of the positive electrode 10 and the negative electrode 20 as an electrode.

The energy storage device 1 according to the present embodiment includes a plurality of sheet-like separators 3.

Figure 3:
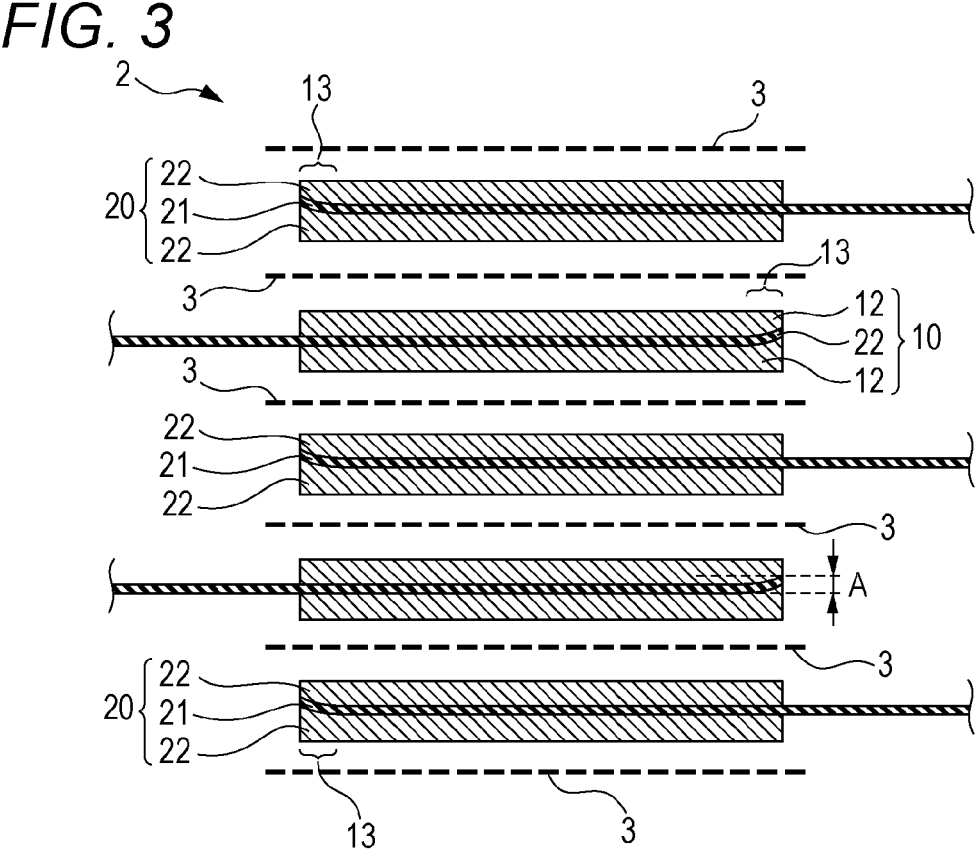
FIG. 3 is a cross-sectional view (schematic diagram of a cross-section of the line II-II in FIG. 5) schematically illustrating a state where electrodes are cut in a thickness direction in another example of the electrode assembly.
Figure 4:
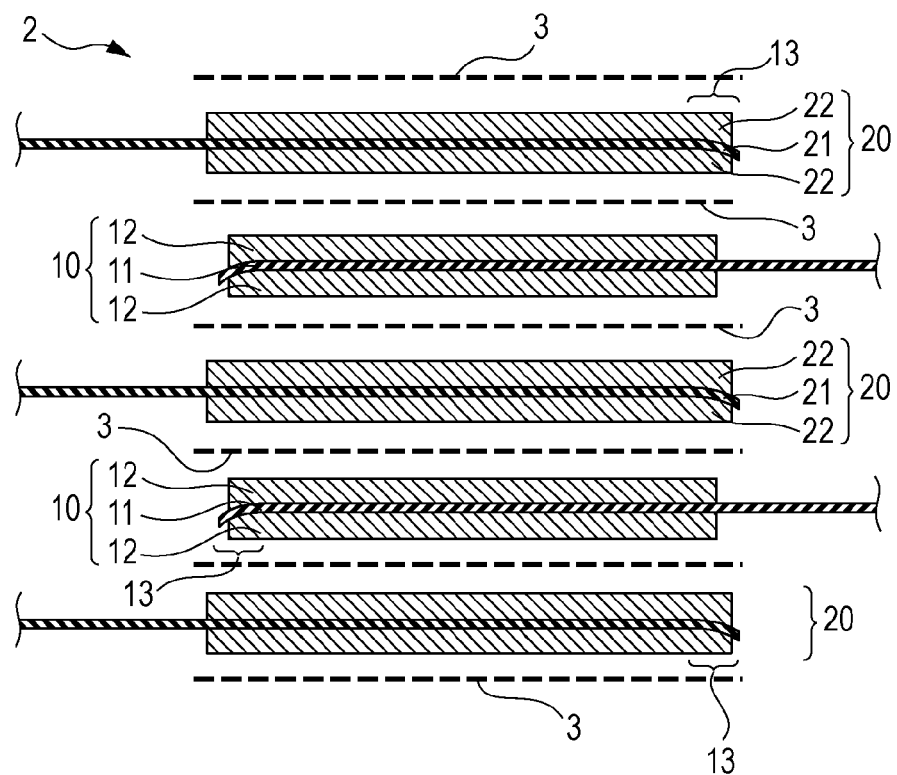
FIG. 4 is a cross-sectional view schematically illustrating a state where electrodes are cut in a thickness direction in another example of the electrode assembly.
Figure 5:
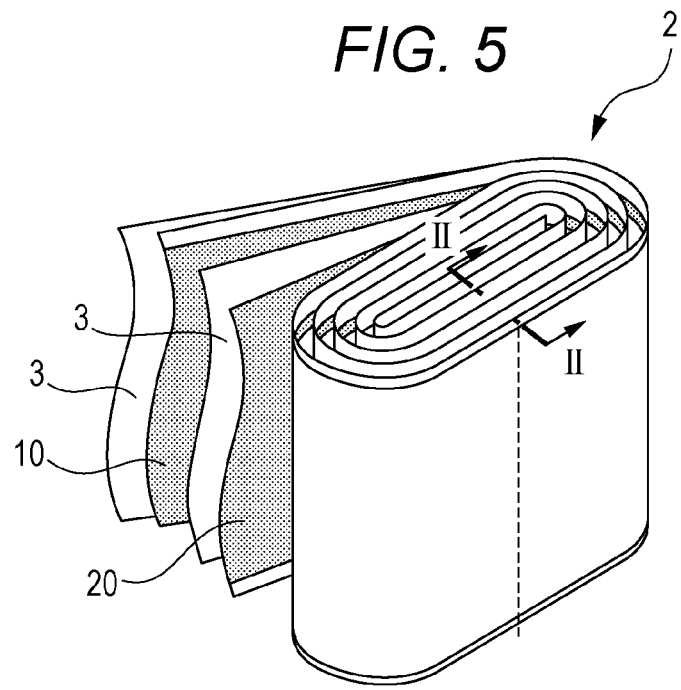
FIG. 5 is a schematic diagram schematically illustrating a state where the positive electrode and the negative electrode are wound.

As illustrated in FIGS. 3 to 5, the separator 3 is disposed between the positive electrode 10 and the negative electrode 20.

The electrode assembly 2 is typically formed in a flat shape.

For example, as illustrated in FIG. 5, the electrode assembly 2 is formed in such a manner that the band-like positive electrode 10 and the band-like negative electrode 20 are wound in a state of being disposed to face each other.

Accordingly, for example, as illustrated in FIG. 1, the positive electrode 10 and the negative electrode 20 are alternately arranged in the thickness direction in at least a part of the electrode assembly 2.

As illustrated in FIGS. 3 and 4, each of the positive electrode 10 and the negative electrode 20 includes a sheet-like current collecting substrate and an active material layer disposed on at least one side of the current collecting substrate.

That is, the positive electrode 10 includes a sheet-like positive electrode current collecting substrate 11 and positive active material layers 12 disposed respectively on at least one side of the positive electrode current collecting substrate 11, the positive active material layer containing a positive active material.

Similarly, the negative electrode 20 includes a sheet-like negative electrode current collecting substrate 21 and negative active material layers 22 disposed respectively on at least one side of the negative electrode current collecting substrate 21, the negative active material layer containing a negative active material.

In the electrode assembly 2, for example, as illustrated in FIGS. 3 and 4, at least a part of the end portion of each of the positive electrode 10 and the negative electrode 20 includes the bent end portion 13 formed by being cut in the thickness direction.

At the bent end portion 13, for example, as illustrated in FIGS. 3 and 4, the active material layers 12 and 22 are disposed on both surfaces of the current collecting substrates 11 and 21, respectively. In addition, the current collecting substrates 11 and 21 extend toward end edges of the electrodes (positive electrode 10 and negative electrode 20) and are simultaneously bent toward one surface of the electrodes, respectively.

Figure 2:
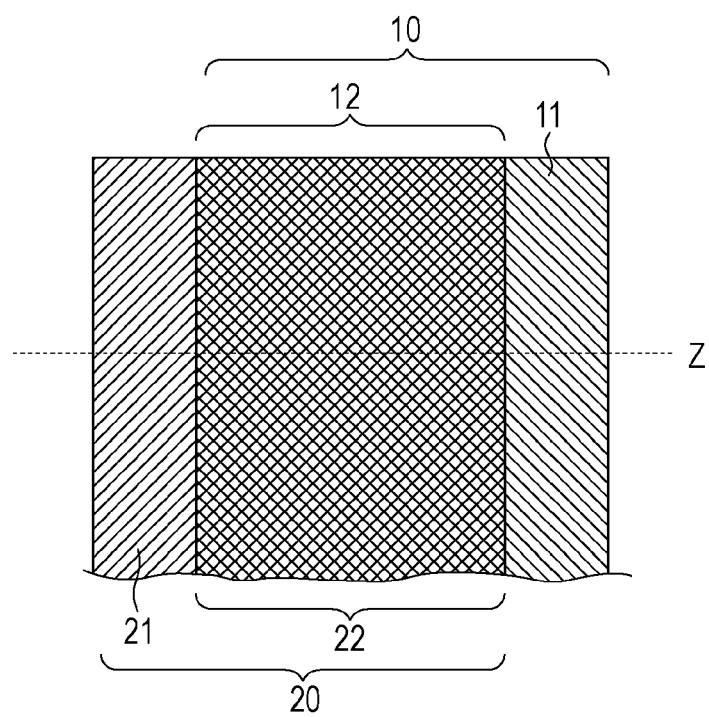
FIG. 2 is a schematic diagram schematically illustrating a state before a positive electrode and a negative electrode are wound, when viewed from one side.
Figure 6:
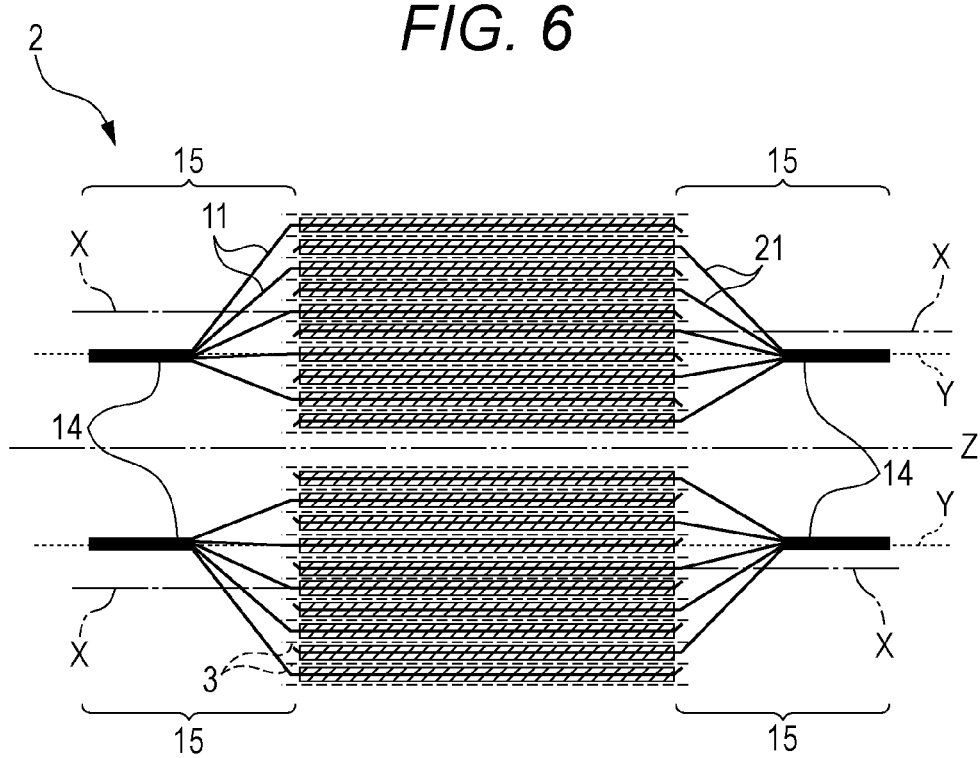
FIG. 6 is a cross-sectional view schematically illustrating a cross-section in another example of the electrode assembly formed by the winding of the positive electrode and the negative electrode.

Furthermore, in the electrode assembly 2, for example, as illustrated in FIGS. 1, 2, and 6, the bent end portion 13 of the positive electrode 10 is disposed on one side of a winding axis Z of the electrode assembly 2.

Moreover, the bent end portion 13 of the positive electrode 10 is arranged in the layered direction.

In addition, the bending direction of the current collecting substrate at the bent end portion 13 of the positive electrode 10 is aligned in a part of the electrode assembly 2. That is, in the portion of the electrode assembly 2, the bent end portion 13 of the positive electrode 10 is disposed such that the bending direction of the current collecting substrate is aligned.

In addition, for example, as illustrated in FIG. 1, the electrode assembly 2 includes the extension portion 15 formed in such a manner that the negative electrode current collecting substrates 21 of the negative electrode 20 extend outward more than the bent end portion 13 of the positive electrode 10, and the extension portion 15 includes the bundle portion 14 formed by bundling the negative electrode current collecting substrates 21 at the leading end side in the extending direction.

Moreover, the bundle portion 14 is disposed in the bending direction (for example, a position indicated by a dashed line Y) of the current collecting substrate at the bent end portion 13 from the center (a position indicated by one-dot broken line X) of the thickness of the extension portion 15.

That is, a position of the bundle portion 14 formed by bundling the negative electrode current collecting substrates 21 of the negative electrode 20 is biased toward one side from the center of the thickness of the extension portion 15, and the biased direction is the bending direction of the positive electrode current collecting substrate 11 at the bent end portion 13 of the positive electrode 10.

Accordingly, since the bundle portion 14 formed by bundling the negative electrode current collecting substrates 21 is biased toward the bending direction of the positive electrode current collecting substrate 11 at the bent end portion 13 of the positive electrode 10, the bending direction of the positive electrode current collecting substrate 11 at the bent end portion 13 of the positive electrode 10 and the extending direction toward the bundled position of the negative electrode current collecting substrate 21 of the negative electrode 20 are more easily aligned. Thus, the extension portion 15 (negative electrode current collecting substrate 21) and the positive electrode current collecting substrate 11 at the bent end portion 13 of the positive electrode 10 are suppressed from approaching each other.

Accordingly, in the energy storage device 1 according to the present embodiment, a short circuit is suppressed between the electrodes.

Incidentally, the above description is similarly applied even when the positive electrode 10 and the negative electrode 20 are reversed.

As illustrated in FIG. 2, the positive electrode 10 and the negative electrode 20 are disposed such that the positive active material layer 12 and the negative active material layer 22 face each other.

Furthermore, in the positive electrode 10, when the positive electrode 10 is viewed from one side in the thickness direction to the other side, the positive electrode current collecting substrate 11 is disposed to protrude (extend) outward and toward one side of the winding axis direction Z from the positive active material layer 12.

Meanwhile, in the negative electrode 20, when the negative electrode 20 is viewed from one side in the thickness direction to the other side, the negative electrode current collecting substrate 21 is disposed to protrude (extend) outward and toward the other side of the winding axis direction Z from the negative active material layer 22.

For example, as illustrated in FIG. 2, the positive electrode 10 has a band-like shape.

The thickness of the positive electrode 10 is typically 35 to 250 μm. In addition, the thickness of the positive electrode current collecting substrate 11 is typically 5 to 50 μm, and the thickness of the positive active material layer 12 is typically 15 to 100 μm.

For example, as illustrated in FIG. 2, the negative electrode 20 has a band-like shape.

The thickness of the negative electrode 20 is typically 35 to 250 μm. In addition, the thickness of the negative electrode current collecting substrate 21 is typically 5 to 50 μm, and the thickness of the negative active material layer 22 is typically 15 to 100 μm.

For example, as illustrated in FIGS. 3 and 4, the positive electrode 10 and the negative electrode 20 are overlapped with each other with the separator 3 interposed therebetween such that the positive active material layer 12 and the negative active material layer 22 face each other in the thickness direction.

That is, in the electrode assembly 2, the positive electrode 10 and the negative electrode 20 are wound and the positive active material layer 12 of the positive electrode 10 faces the negative active material layer 22 of the negative electrode 20 through the separator 3.

At least a part of the end portion of each of the electrodes (positive electrode 10 and negative electrode 20) has the bent end portion 13 formed by being cut in the thickness direction.

The bent end portion 13 is formed in such a manner that the wide electrode plate including a pre-cutting current collecting substrate and pre-cutting active material layers respectively disposed on at least one side of the pre-cutting current collecting substrate is cut in the thickness direction.

That is, the bent end portion 13 is formed in such a manner that the wide electrode plate is cut by cutting force applied from at least one side in the thickness direction toward the other side.

The wide electrode plate will be described below in detail.

Since the bent end portion 13 is formed in such a manner that the wide electrode plate is cut in the thickness direction, the current collecting substrate is bent toward one active material layer (one side of the electrode in the thickness direction) of the electrode at the bent end portion 13. At the bent end portion 13, for example, the active material layers are disposed on both surfaces of the current collecting substrate, respectively.

For example, the bent end portion 13 is formed to approach one surface side of the electrode as the current collecting substrate is bent toward the end edge.

The bent end portion 13 represents a part of the end portion of each electrode from a site where the current collecting substrate extending toward the end edge of the electrode starts to approach one surface side of the electrode to the end edge of the electrode.

For example, as illustrated in FIG. 3, the bent end portion 13 is formed such that the end edge of the current collecting substrate and the end edge of each active material layer have the same plane. Alternatively, for example, as illustrated in FIG. 4, the bent end portion 13 may be formed such that the end edge of the current collecting substrate protrudes outward more than the end edge of the active material layer.

At the bent end portion 13, the current collecting substrates 11 and 21 typically have a bent width (length "A" illustrated in FIG. 3) which exceeds 0 μm and 100 μm or less. The bent width represents the maximum width (length in thickness direction) of the current collecting substrate at the bent end portion 13.

For example, the bent end portion 13 is formed on at least a part of the end portion of each of the electrodes (positive electrode 10 and negative electrode 20).

Specifically, for example, the bent end portion 13 is formed along at least one side of two sides extending in a longitudinal direction of the band-like electrode.

More specifically, for example, the bent end portion 13 is formed along at least one side of two sides extending in a longitudinal direction of the band-like positive electrode 10. In addition, for example, the bent end portion 13 is formed along at least one side of two sides extending in a longitudinal direction of the band-like negative electrode 20.

As described above, the electrode assembly 2 is formed by the winding of the band-like positive electrode 10 and the band-like negative electrode 20.

Then, in the electrode assembly 2 formed by the winding, for example, as illustrated in FIGS. 3, 4, and 6, the bent end portion 13 of the positive electrode 10 is disposed at one side of the winding axis Z.

In addition, the bending direction of the positive electrode current collecting substrate 11 at the bent end portion 13 of the positive electrode 10 is the direction toward the winding center (the winding axis) or a reverse direction thereof, and the negative electrode current collecting substrate 21 of the negative electrode 20 extends outward more than the bent end portion 13 of the positive electrode 10. In addition, the extension portion 15 is formed by the negative electrode current collecting substrate 21 which is extended. The extension portion 15 includes the bundle portion 14 formed by bundling the negative electrode current collecting substrates 21 at the leading end side in the extending direction.

Moreover, in the electrode assembly 2 formed by the winding, for example, as illustrated in FIGS. 3, 4, and 6, the bent end portion 13 of the negative electrode 20 is disposed at the other side of the winding axis Z.

In addition, the bending direction of the negative electrode current collecting substrate 21 at the bent end portion 13 of the negative electrode 20 is a winding center direction or a reverse direction thereof. The positive electrode current collecting substrate 11 of the positive electrode 10 extends outward more than the bent end portion 13 of the negative electrode 20. In addition, the extension portion 15 is formed by the positive electrode current collecting substrate 11 which is extended. The extension portion 15 includes the bundle portion 14 formed by bundling the positive electrode current collecting substrates 11 at the leading end side in the extending direction.

Since the energy storage device 1 according to the present embodiment is provided with the electrode assembly 2 configured as described above, the number of junction points between the current collecting substrate and a current collector to be described below can be increased. Therefore, it is possible to more lower internal resistance of the energy storage device. In addition, it is possible to more reliably suppress the deformation of the electrode assembly 2 by repetition of charge-discharge.

The bent end portions 13 are disposed to straightly extend side by side with the winding axis Z held therebetween when the electrode assembly 2 is viewed from one side of the winding axis Z to the other side. Moreover, the bent end portions 13 are also disposed in a circular arc shape to connect the bent end portions 13, which are disposed to straightly extend side by side with the winding axis Z held therebetween, to each other.

That is, when being viewed from one side of the winding axis Z to the other side, the electrode assembly 2 includes a part where the electrode is wound such that the bent end portion 13 straightly extends and a part where the electrode is wound such that the extending direction of the bent end portion 13 is a reverse direction while the bent end portion 13 draws a circular arc.

The bent end portion 13 is disposed as described above when the electrode assembly 2 is viewed from the other side of the winding axis Z.

In addition, the bent end portions 13 of the positive electrode 10 are arranged in a layered direction at one side of the winding axis of the electrode assembly 2. Similarly, the bent end portions 13 of the other electrode (for example, negative electrode 20) are arranged in a layered direction at the other side of the winding axis of the electrode assembly 2.

In the electrode assembly 2, for example, the positive electrode 10 is disposed such that the positive electrode current collecting substrate 11 at the bent end portion 13 is bent toward the winding center side. Similarly, for example, the negative electrode 20 is disposed such that the negative electrode current collecting substrate 21 at the bent end portion 13 is bent toward the winding center side. That is, both of the positive electrode 10 and the negative electrode 20 may be disposed such that the current collecting substrate at the bent end portion 13 is bent toward the winding center side.

Meanwhile, both of the positive electrode 10 and the negative electrode 20 may be disposed such that the current collecting substrate at the bent end portion 13 is bent toward the side opposite to the winding center side.

In the electrode assembly 2, as described above, the extension portion 15 is formed by the extended current collecting substrate of each electrodes. Then, the bundle portion 14 is formed by bundling the current collecting substrates of the extension portion 15 in the electrode assembly 2.

The bundle portion 14 extends along the bent end portion 13 which substantially straightly extends when the electrode assembly 2 is viewed from one side of the winding axis Z to the other side.

As illustrated in FIG. 6, for example, two bundle portions 14 are formed so as to be arranged in the thickness direction of the electrode assembly 2 at one side of the winding axis Z of the electrode assembly 2 and to hold the winding axis Z of the electrode assembly 2 therebetween.

In addition, for example, two bundle portions 14 are formed so as to be arranged in the thickness direction of the electrode assembly 2 at the other side of the winding axis Z of the electrode assembly 2 and to hold the winding axis Z of the electrode assembly 2 therebetween.

In addition, the bundle portions 14 are formed by bundling the current collecting substrates 11 and 21 which are exposed while not being covered with the active material layer, respectively.

The position (position where the current collecting substrates are bundled in the extension portion 15) of the bundle portion 14 is on the bending direction side of the current collecting substrate at the bent end portion 13 from the center of the thickness of the extension portion 15.

Specifically, for example, the bundle portion 14 (extended negative electrode current collecting substrate 21) is disposed on the bending direction side of the positive electrode current collecting substrate 11 at the bent end portion 13 of the positive electrode 10 from the center of the thickness of the extension portion 15, at one side of the winding axis of the electrode assembly 2. Also at the other side of the winding axis of the electrode assembly 2, the bundle portion 14 (extended positive electrode current collecting substrate 11) is disposed at the same position as described above.

The bundle portions 14 are preferably disposed between the current collecting substrate disposed at the most leading end side of the extension portion 15 in the bending direction of the current collecting substrate at the bent end portion 13 and the center of the thickness of the extension portion 15. More preferably, the bundle portions 14 are disposed to be arranged with the current collecting substrate, which is disposed at the most leading end side of the extension portion 15 in the bending direction of the current collecting substrate at the bent end portion 13, in the winding axis direction.

The thickness of the extension portion 15 represents the maximum thickness of the extension portion 15. That is, it represents the maximum length between the current collecting substrates disposed at both end portions in the thickness direction, among the current collecting substrates bundled into one in the bundle portion 14.

The position of the bundle portion 14 is determined based on the center in the thickness direction of the bundle portion 14.

At one side and the other side of the winding axis Z of the electrode assembly 2, the distance between which the bundle portion 14 and the bent end portion 13 facing the bundle portion 14 are separated from each other in the direction of the winding axis Z is appropriately adjusted.

The bundled number of the current collecting substrates bundled by one bundle portion 14 is not particularly limited, but is appropriately adjusted.

In general, the positive electrode current collecting substrate 11 is formed in a rectangular sheet shape such as a band shape.

The thickness of the positive electrode current collecting substrate 11 is not particularly limited, but is typically 5 to 50 μm.

Examples of materials of the positive electrode current collecting substrate 11 may include metals such as aluminum, titanium, stainless steel, and nickel.

Examples of the materials of the positive electrode current collecting substrate 11 may include baked carbon, conductive polymers etc. in addition to the metals.

The shape of the positive active material layer 12 is, for example, a rectangular shape when viewed from one surface side.

The positive active material includes a metal compound that can contribute to an electrode reaction of a charge reaction and a discharge reaction in the positive electrode 10.

The positive active material is typically formed into particles.

The metal compound included in the positive active material is not particularly limited, but may be, for example, lithium composite oxides such as lithium nickelate ($LiNiO_2$), spinel lithium manganate ($LiMn_2O_4$), and lithium cobaltate ($LiCoO_2$).

In addition, examples of the metal compound may include olivine-type lithium metal phosphate such as lithium iron phosphate.

If necessary, the positive active material layer 12 contains a conductive agent, a binder, a thickener, a filler, etc. as a component.

Examples of the conductive agent include, but are not particularly limited to, natural graphite (scale-like graphite, flaky graphite, earthy graphite or the like), artificial graphite, carbon black, acetylene black, ketjen black, carbon whisker, carbon fibers, metal (copper, nickel, aluminum, silver, gold or the like) powders, metal fibers, and conductive ceramics.

For example, as the conductive agent, a single substance or a mixture of two or more thereof is employed.

Examples of the binder include, but are not particularly limited to, thermoplastic resins such as polytetrafluoroethylene (PTFE), polyvinylidene fluoride (PVDF), polyethylene, and polypropylene, ethylene-propylene-diene terpolymer (EPDM), sulfonated EPDM, styrene-butadiene rubber (SBR), and fluorine rubber.

For example, as the binder, a single substance or a mixture of two or more thereof is employed.

Examples of the thickener include, but are not particularly limited to, polysaccharides such as carboxymethylcellulose and methylcellulose.

For example, as the thickener, a single substance or a mixture of two or more thereof is employed.

Examples of the filler include, but are not particularly limited to, olefin-based polymers such as polypropylene and polyethylene, amorphous silica, alumina, zeolite, and glass.

The negative electrode current collecting substrate 21 is typically formed in a rectangular shape such as a band shape.

The thickness of the negative electrode current collecting substrate 21 is not particularly limited, but is typically 5 to 50 μm.

Examples of materials of the negative electrode current collecting substrate 21 may include metals such as copper, nickel, iron, stainless steel, titanium, and aluminum.

Examples of the materials of the negative electrode current collecting substrate 21 may include baked carbon, conductive polymers etc. in addition to the metals.

The shape of the negative active material layer 22 is, for example, a rectangular shape when viewed from one side.

The negative active material is a substance that can contribute to an electrode reaction of a charge reaction and a discharge reaction in the negative electrode 20.

An example of the negative active material may include at least one of carbonaceous materials, lithium metal, alloys capable of insertion and extraction of lithium ion (lithium alloy and the like), metal oxides represented by a general formula MOz ("M" represents at least one element selected from W, Mo, Si, Cu, and Sn, and "z" represents a numerical value in the range of $0<z\leq2$), lithium metal oxides ($Li_4Ti_5O_{12}$ and the like), and polyphosphoric acid compounds.

An example of the carbonaceous material may include at least one of graphite and amorphous carbon.

Examples of the amorphous carbon may include hardly-graphitizable carbon (hard carbon), easily-graphitizable carbon (soft carbon) etc.

Examples of the alloy capable of insertion and extraction of lithium-ions may include wood alloys, at least one lithium alloy of lithium-aluminum alloy, lithium-lead alloy, lithium-tin alloy, lithium-aluminum-tin alloy, lithium silicon alloy, and lithium-gallium alloy, etc.

Similarly to the positive active material layer 12, the negative active material layer 22 contains the binder, thickener, filler, and the like as a component, if necessary.

In the electrode assembly 2, for example, an area of the negative active material layer 22 is larger than that of the positive active material layer 12 in a state where the positive electrode 10 and the negative electrode 20 face each other. Moreover, for example, as illustrated in FIG. 4, an end edge of the negative active material layer 22 protrudes outward more than an end edge of the positive active material layer 12, in a cross-section in the thickness direction.

With such a configuration, it is possible to certainly insert Li-ions, which are moved toward the negative electrode 20 from the positive active material layer 12 during the charge, onto the negative active material layer 22.

The separator 3 prevents a short circuit between the electrodes while ensuring charge/discharge reaction between the electrodes.

The separator 3 is disposed between the positive active material layer 12 of the positive electrode 10 and the negative active material layer 22 of the negative electrode 20.

The separator 3 is made of, for example, a porous film or a nonwoven fabric. For example, the separator 3 is made of a single material of the porous film or the nonwoven fabric or a mixture thereof.

Examples of materials of the separator 3 may include at least one of polyolefin-based resins such as polyethylene and polypropylene, polyester-based resins such as polyethylene terephthalate and polybutylene terephthalate, and fluorine-based resins, etc.

Figure 7:
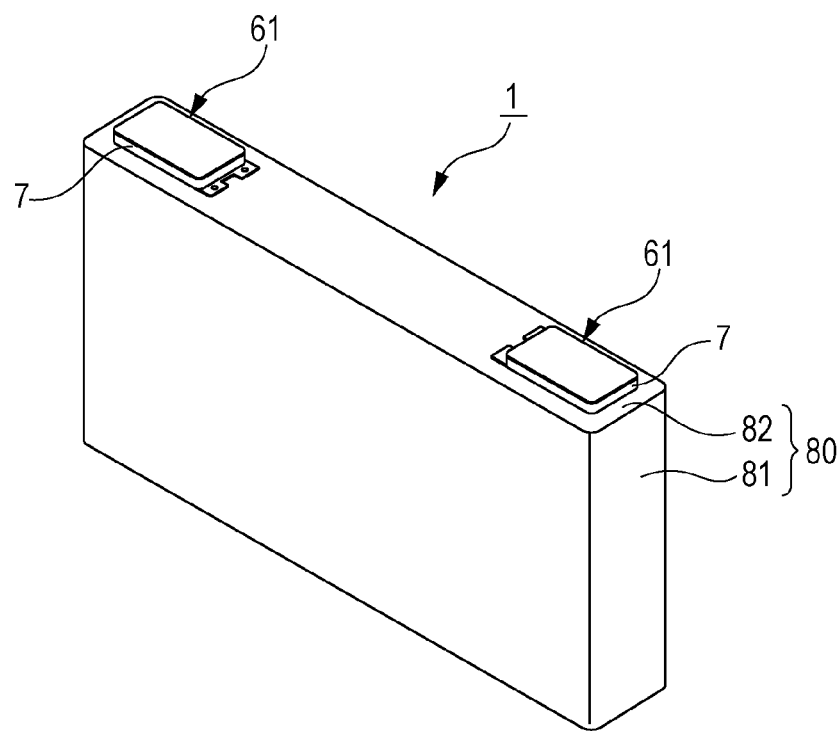
FIG. 7 is a schematic diagram schematically illustrating an appearance of a nonaqueous electrolyte secondary battery (lithium ion secondary battery) as an energy storage device.

Moreover, for example, as illustrated in FIG. 7, the nonaqueous electrolyte secondary battery 1 includes a case 80 which accommodates the electrode assembly 2 therein.

In addition, the nonaqueous electrolyte secondary battery 1 contains an electrolyte solution 5 stored in the case 80.

Specifically, for example, as illustrated in FIGS. 7 to 10, the nonaqueous electrolyte secondary battery includes the case 80, the electrolyte solution 5 accommodated in the case 80, two external gaskets 7 attached to an outer surface of the case 80, the electrode assembly 2 accommodated in the case 80, two current collectors 9 electrically connected to the electrode assembly 2, and two external terminals 61 electrically connected to the two current collectors 9, respectively.

The electrolyte solution 5 is accommodated in the case 80. The electrode assembly 2 accommodated in the case 80 is impregnated with at least a part of the electrolyte solution 5.

The electrolyte solution 5 typically contains a nonaqueous solvent and an electrolyte salt.

In general, the electrolyte solution 5 contains the electrolyte salt at a concentration of 0.5 to 2.0 mol/L.

The nonaqueous solvent to be generally used in the energy storage device or the like is employed.

Specifically, examples of the nonaqueous solvent may include cyclic carbonate esters, lactones, chain carbonates, chain esters, ethers, nitriles, etc.

Examples of the cyclic carbonate esters may include propylene carbonate, ethylene carbonate, butylenes carbonate, chloroethylene carbonate, etc.

Examples of the lactones may include γ-butyrolactone, γ-valerolactone, etc.

Examples of the chain carbonates may include dimethyl carbonate, diethyl carbonate, ethyl methyl carbonate, etc.

Examples of the chain esters may include methyl formate, methyl acetate, methyl butyrate, etc.

Examples of the ethers may include 1,3-dioxane, 1,4-dioxane, 1,2-dimethoxyethane, 1,4-dibutoxyethane, methyl diglyme, etc.

Examples of the nitriles may include acetonitrile, benzonitrile, etc.

Moreover, examples of the nonaqueous solvent may include tetrahydrofuran and derivatives thereof, dioxolane and derivatives thereof, ethylenesulfide, sulfolane, sultone and derivatives thereof, etc.

As the nonaqueous solvent, the single substance or the mixture of two or more thereof described above is employed, but is not limited thereto.

Examples of the electrolyte salt may include lithium salts such as $LiPF_6$, $LiClO_4$, $LiBF_4$, $LiAsF_6$, $LiCF_3SO_3$, $LiN(SO_2CF_3)_2$, $LiN(SO_2C_2F_5)_2$, $LiN(SO_2CF_3)(SO_2C_4F_9)$, LiSCN, LiBr, LiI, $Li_2SO_4$, and $Li_2B_{10}Cl_{10}$.

As the electrolyte salt, the single substance or the mixture of two or more thereof described above is employed, but is not limited thereto.

As illustrated in FIG. 7, the case 80 includes a case body 81 which is opened in one direction and accommodates the electrode assembly 2 and a plate-shaped cover plate 82 which closes the opening of the case body 81. The case body 81 and the cover plate 82 are formed of, for example, an aluminum-based metal material such as aluminum or aluminum alloy and are welded to each other.

The cover plate 82 has, for example, a rectangular shape when viewed from one side. The cover plate 82 is formed to airtightly close the opening of the case body 81.

In addition, two openings are formed in the cover plate 82.

Two external gaskets 7 are attached to an outer surface of the cover plate 82. An opening is formed in each of the external gasket 7. The cover plate 82 and each of the external gaskets 7 are disposed such that the opening of the cover plate 82 is connected with the opening of the external gasket 7. External terminals 61 are partially disposed inside the openings connected with each other.

Each of the external terminals 61 is connected to each of the two current collectors 9 connected to the electrode assembly 2. In addition, each of the current collectors 9 is electrically connected to the electrode assembly 2. That is, each of the external terminals 61 is electrically connected to the electrode assembly 2 through the two current collectors 9.

The external terminal 61 is formed of, for example, an aluminum-based metal material such as aluminum or aluminum alloy.

The external gaskets 7, the current collectors 9, and the external terminals 61 for the positive electrode and the negative electrode are provided, respectively.

The external gasket 7, the current collector 9, and the external terminal 61 for the positive electrode are respectively disposed on one end side of the cover plate 82 in a longitudinal direction. Meanwhile, the external gasket 7, the current collector 9, and the external terminal 61 for the negative electrode are respectively disposed on the other end side of the cover plate 82 in the longitudinal direction.

Figure 8:
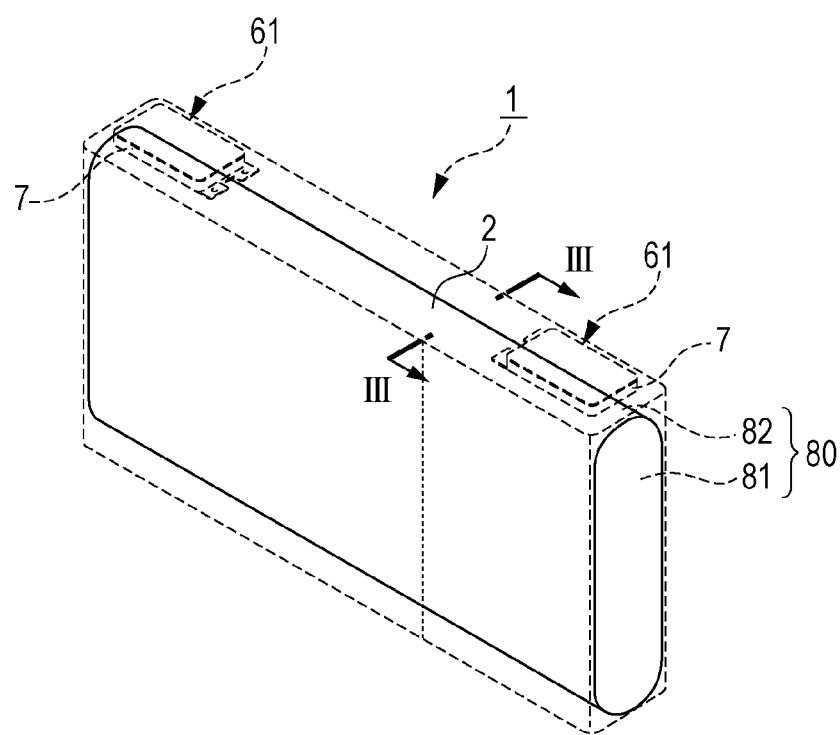
FIG. 8 is a schematic diagram schematically illustrating an internal structure of the nonaqueous electrolyte secondary battery (lithium ion secondary battery) as the energy storage device.
Figure 9:
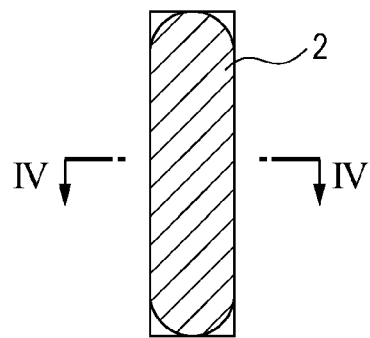
FIG. 9 is a schematic view schematically illustrating a cross-section of the line III-III in FIG. 8.
Figure 10:
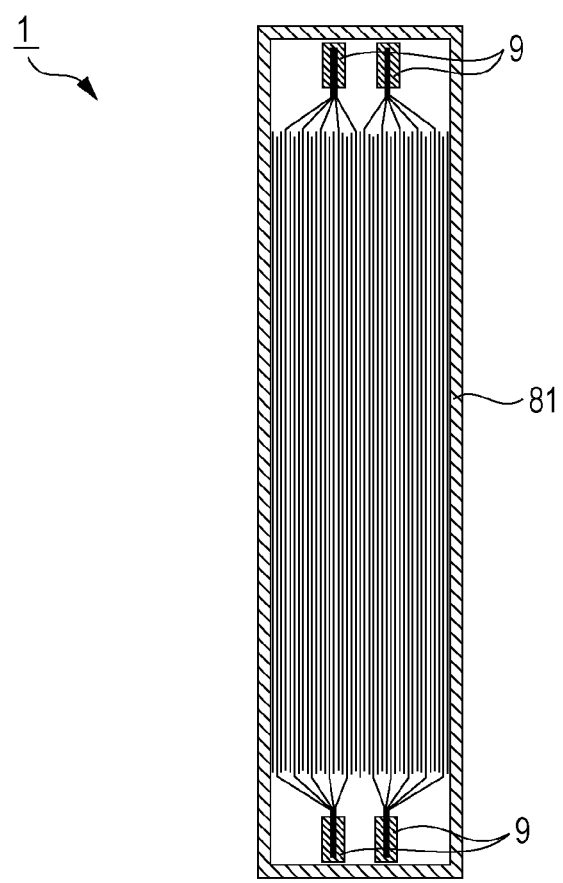
FIG. 10 is a schematic view schematically illustrating a cross-section of the line IV-IV in FIG. 9.
Figure 11:
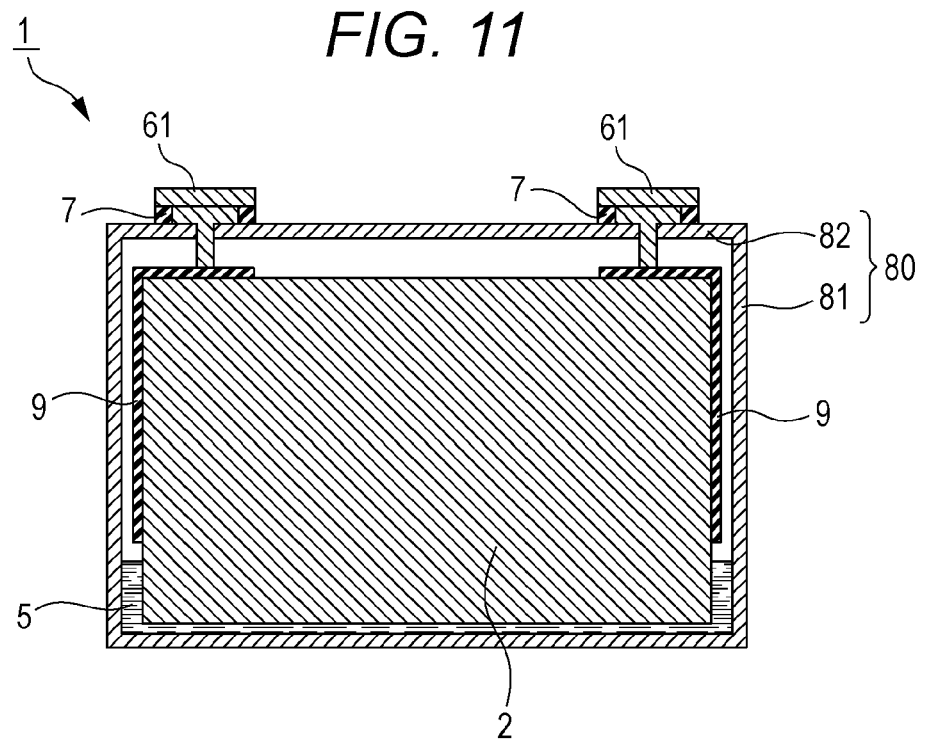
FIG. 11 is a schematic cross-sectional view schematically illustrating the internal structure of the nonaqueous electrolyte secondary battery (lithium ion secondary battery) as the energy storage device.

As illustrated in FIGS. 8 and 9, the electrode assembly 2 is accommodated inside the case body 81 of the case 80. In addition, a space is formed between the case 80 and the electrode assembly 2.

One electrode assembly 2 may be accommodated in the case 80, or a plurality of electrode assemblies may be accommodated therein. In the latter case, the plurality of electrode assemblies are electrically connected to each other in parallel.

In the above nonaqueous electrolyte secondary battery 1, for example, as illustrated in FIGS. 7 and 9, the case 80 is disposed such that the cover plate 82 of the case 80 is an upper side, and the wound electrode assembly 2 is accommodated in the case 80 such that the direction of the winding axis Z is a transverse direction. Then, the electrolyte solution 5 is stored in the case 80.

The energy storage device 1 according to the present embodiment is provided with the electrode assembly 2 formed by winding of the positive electrode 10 and the negative electrode 20 facing each other as described above, but the energy storage device of the present invention may be provided with the electrode assembly formed in such a manner that, using a plurality of positive electrodes and a plurality of negative electrodes, the positive electrodes and the negative electrodes are alternately and repeatedly stacked in the thickness direction.

Subsequently, the energy storage device 1 in another specific example will be described.

As illustrated in FIGS. 12 to 15, the energy storage device 1 may be provided with the electrode assembly in which the positive electrode and the negative electrode as the electrode are alternately arranged in the layered direction. That is, the energy storage device 1 in the specific example is provided with the electrode assembly 2 in which the plurality of positive electrodes 10 and the plurality of negative electrodes 20 are layered.

In the electrode assembly 2 in the specific example, the bent end portion 13 of at least one of the positive electrode 10 or the negative electrode 20 is arranged in the layered direction. In the bent end portions 13 of the plurality of positive electrodes arranged in the layered direction, each of the current collecting substrates has the same bending direction. In the bent end portions 13 of the plurality of negative electrodes arranged in the layered direction, each of the current collecting substrates has the same bending direction.

The bent end portion 13 is formed on at least a part of the end portion of each of the electrodes (positive electrode 10 and negative electrode 20). Preferably, at least one electrode is formed in a rectangular shape and the bent end portions 13 are formed at end portions along at least two sides of the rectangular electrode.

Specifically, for example, the bent end portions 13 are formed along three sides of the rectangular electrode. A current collecting tab to be described below is an end portion at which the bent end portion 13 is not formed and can be disposed at a part of an end portion along the remaining one side of the electrode.

The bent end portions 13 may be formed at all of the end portions of each of the electrodes (positive electrode 10 and negative electrode 20). Specifically, for example, the bent end portions 13 may be formed by punching of the wide electrode plate at all of the end portions. By the punching of the wide electrode plate, the current collecting tab protruding outward more than the separator 3 can be formed.

A part of the end portion of the positive electrode current collecting substrate 11 protrudes outward and may be formed with a current collecting tab 11a. In addition, a part of the end portion of the negative electrode current collecting substrate 21 protrudes outward and may be formed with a current collecting tab 21a.

The energy storage device in the specific example described above includes the case 80 accommodating the electrode assembly 2 and a terminal serving as an electrical path with the outside of the battery during the charge-discharge. As the terminal, for example, a plate-shaped flat terminal 65 is used.

Figure 14:
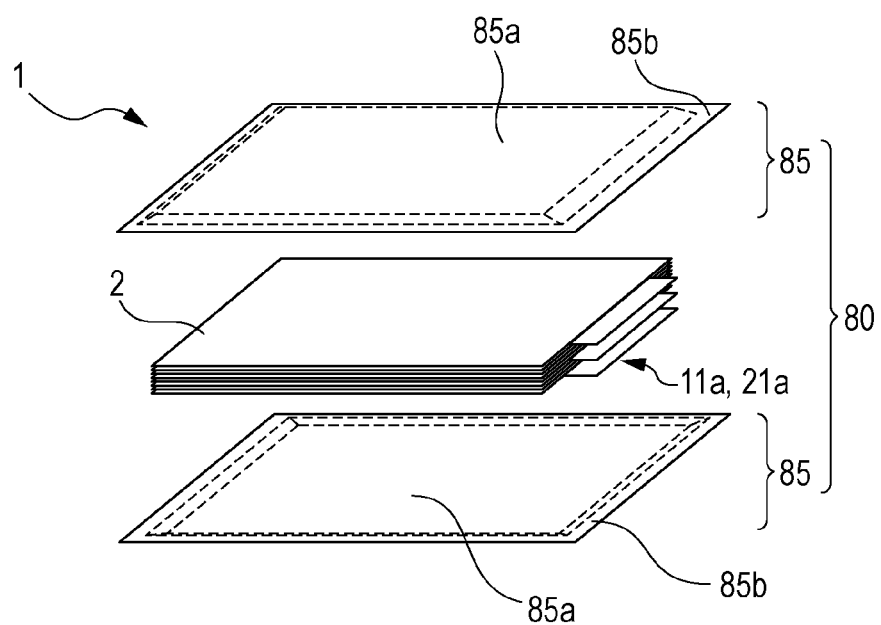
FIG. 14 is an exploded schematic diagram of a specific example of an energy storage device.
Figure 15:
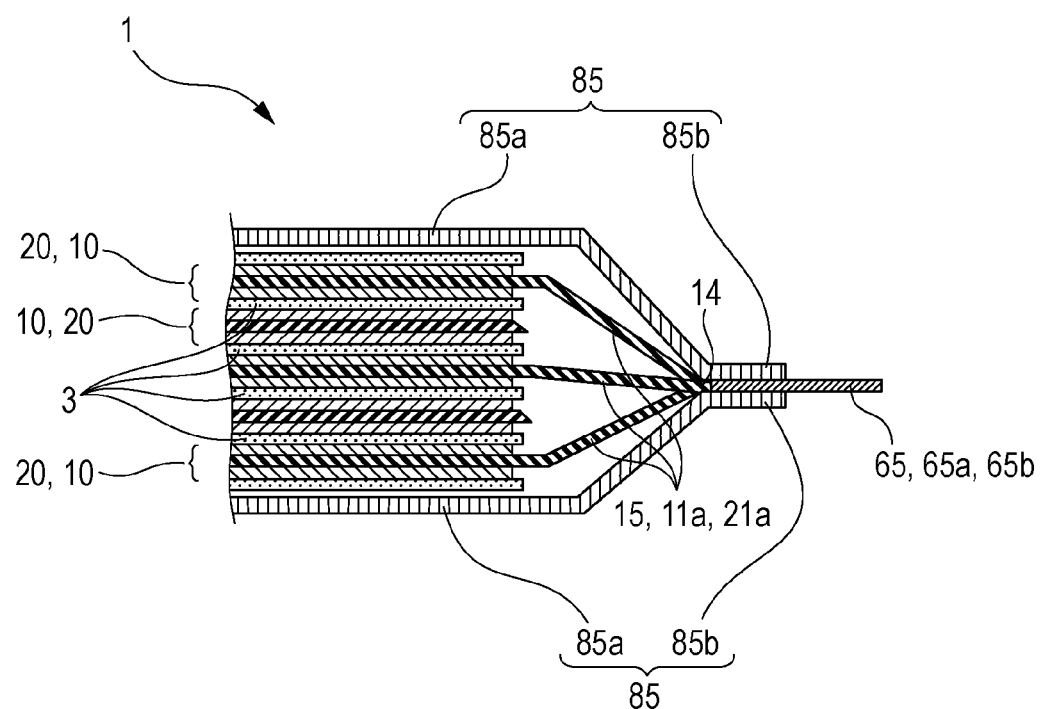
FIG. 15 is a schematic view schematically illustrating a part of a cross-section of the specific example of the energy storage device.

As illustrated in FIG. 14, the case 80 includes a pair of case pieces 85. Each of the case pieces 85 is opened in one direction and includes an accommodation portion 85a accommodating the electrode assembly 2 and a flange portion 85b extending outward from an opening edge of the accommodation portion 85a.

The case 80 is configured to accommodate the electrode assembly 2 and the electrolyte solution in an internal space between two accommodation portions 85a formed after surfaces of the flange portions 85b of the case pieces 85 are joined to each other while the openings of the accommodation portion 85a of the case pieces 85 face each other.

Each of the case pieces 85 is formed of, for example, a laminate material in which an aluminum foil and a resin film are layered.

The electrode assembly 2 is surrounded by the case 80 from the outside and is accommodated in the case 80 when the pair of case pieces 85 are joined to each other as described above.

As the flat terminal 65, a flat terminal 65a for the positive electrode and a flat terminal 65b for the negative electrode are used.

The flat terminal 65a for the positive electrode is connected to the current collecting tab 11a of each positive electrode current collecting substrate 11 in the electrode assembly 2 by, for example, a welding treatment. The current collecting tab 11a corresponds to the extension portion 15. The outer portions of the current collecting tabs 11a are bundled by overlapping with each other and are connected to the flat terminal 65a. The portion where the current collecting tabs 11a are bundled corresponds to the bundle portion 14.

Similarly, the flat terminal 65b for the negative electrode is connected to the current collecting tab 21a of each negative electrode current collecting substrate 21 in the electrode assembly 2 by, for example, a welding treatment. The current collecting tab 21a corresponds to the extension portion 15. The outer portions of the current collecting tabs 21a are bundled by overlapping with each other and are connected to the flat terminal 65b. The portion where the current collecting tabs 21a are bundled corresponds to the bundle portion 14.

A part of the flat terminal 65 is disposed outside the case 80 so as to be electrically connected to another energy storage device or an external device.

A method of manufacturing the nonaqueous electrolyte secondary battery 1 (lithium ion secondary battery) as the above energy storage device 1 will be described below.

The nonaqueous electrolyte secondary battery 1 is manufactured by a general method.

For example, the nonaqueous electrolyte secondary battery 1 can be manufactured by performing: an wide electrode plate producing step of producing an wide electrode plate including a sheet-like pre-cutting current collecting substrate and a pre-cutting active material layer containing an active material disposed on at least one side of the pre-cutting current collecting substrate; a cutting step of producing the positive electrode 10 and the negative electrode 20 as an electrode by cutting the wide electrode plate in the thickness direction; an electrode assembly producing step of producing the electrode assembly 2 by overlapping the positive electrode 10 and the negative electrode 20, which are produced by the cutting, and the sheet-like separator 3 with one another at least in the thickness direction; a bundling step of bundling the positive electrode current collecting substrates 11 to each other and bundling the negative electrode current collecting substrates 21 to each other in the produced electrode assembly 2; and an accommodating step of accommodating the electrode assembly 2 and the electrolyte solution 5 in the case 80.

In the wide electrode plate producing step, a wide positive electrode plate and a wide negative electrode plate are respectively produced as the wide electrode plate.

In the production of the wide positive electrode plate, for example, a positive composite is prepared by mixing of the above-described particulate positive active material, the conductive agent, the binder, and the thickener with an organic solvent such as N-methyl-2-pyrrolidone (NMP). Thereafter, the positive composite is applied onto at least one side of the sheet-like pre-cutting positive electrode current collecting substrate. Then, the organic solvent is volatilized from the positive composite by drying, and thus the wide positive electrode plate is produced in which the positive active material layer (pre-cutting) is disposed on at least one side of the pre-cutting positive electrode current collecting substrate.

As the pre-cutting positive electrode current collecting substrate, the same material as the above-described positive electrode current collecting substrate 11 is employed.

Further, in the production of the wide positive electrode plate, for example, the positive composite is not applied onto a part of the pre-cutting positive electrode current collecting substrate, and thus the post-cutting positive electrode includes the current collecting substrate protruding (extending) outside more than the positive active material layer.

In the production of the wide positive electrode plate, as a method of mixing the positive active material, the conductive agent, the binder, the thickener, and the like, a method of mixing the above materials using, for example, a powder mixer such as a V-type mixer, an S-type mixer, a stone mill, a ball-milling, or a planet ball-milling.

In the production of the wide positive electrode plate, a method of applying the positive composite onto the wide positive electrode current collecting substrate plate is not particularly limited, but employs, for example, roller coating such as an applicator roll, screen coating, blade coating, spin coating, or bar coating.

For example, the wide negative electrode plate is produced in the same manner as in the wide positive electrode plate.

Specifically, the wide negative electrode plate is produced by the same method as, for example, the method of producing the wide positive electrode plate described above except for using the particulate negative active material instead of the particulate positive active material.

That is, in the production of the wide negative electrode plate, for example, after a negative composite is prepared by mixing of the above-described particulate positive active material, the binder, and the thickener with an organic solvent, the negative composite is applied onto at least one side of the sheet-like pre-cutting negative electrode current collecting substrate 21. Then, the organic solvent is volatilized from the negative composite by drying. Then, the wide negative electrode plate is produced in which the negative electrode active material layer (pre-cutting) is disposed on at least one side of the pre-cutting negative electrode current collecting substrate 21.

As the pre-cutting negative electrode current collecting substrate 21, the same material as the above-described negative electrode current collecting substrate 21 is employed.

In the cutting step, the wide positive electrode plate and the wide negative electrode plate are cut by a general method.

As the cutting method, for example, a method of cutting the wide plate using the Thomson blade attached to the Thomson punching machine can be employed. Furthermore, for the cutting, a gang mode, a shear mode, a laser type, or a score type can be employed.

In the cutting step, for example, the band-like positive electrode 10 and the band-like negative electrode 20 are produced by the cutting in the case of producing the electrode assembly 2 by the winding.

In addition, as described above, the bent end portion 13 is formed on the electrode by the cutting in the cutting step. In the cutting, the cutting force is applied to either of the wide positive electrode plate and the wide negative electrode plate toward one direction at least in the thickness direction. Accordingly, by the cutting in the cutting step, the current collecting substrate at the bent end portion 13 is bent toward one side in the thickness direction of the current collecting substrate.

In the electrode assembly producing step, for example, a band-like multilayer material is produced in such a manner that the band-like positive electrode 10, a band-like separator 3, the band-like negative electrode 20, and the band-like separator 3 are overlapped with one another in the thickness direction in this order when the electrode assembly 2 is produced by the winding.

Specifically, in the electrode producing step, for example, the positive electrode 10, the negative electrode 20, and the separator 3 are overlapped with one another such that the positive electrode 10, the negative electrode 20, and separator 3 coincide with one another in the longitudinal direction and the positive active material layer 12 and the negative active material layer 22 face each other.

In addition, the positive electrode 10 and the negative electrode 20 are overlapped with each other such that the bending direction of the positive electrode current collecting substrate 11 at the bent end portion 13 of the positive electrode 10 in one side in the width direction is aligned with the bending direction of the negative electrode current collecting substrate 21 at the bent end portion 13 of the negative electrode 20 in the other side in the width direction.

In the electrode assembly producing step, for example, the positive electrode 10 of the produced multilayer material and the separator 3 are disposed to be the inside and the outside, respectively, and the produced band-like multilayer material is wound. The winding is performed such that the electrode assembly after the winding has, for example, a flat plate shape. By the winding in such a way, the positive electrode 10 and the negative electrode 20 are alternately and repeatedly arranged in the thickness direction, thereby producing the electrode assembly 2.

Furthermore, in the electrode assembly producing step, for example, the produced multilayer material is wound such that the bending direction of the current collecting substrate at the bent end portion 13 of each electrode is a winding center side.

In the bundling step, for example, at both sides in the direction of the winding axis of the electrode assembly 2, the positive electrode current collecting substrates 11 are bundled to each other and the negative electrode current collecting substrates 21 are bundled to each other.

Specifically, in the bundling step, when the electrode assembly 2 is viewed from one side in the direction of the winding axis to the other side, the negative electrode current collecting substrates 21 of the negative electrodes 20 are bundled along the bent end portions 13 of the positive electrodes 10 extending straightly with the winding axis Z held therebetween, thereby forming two bundle portions 14 with the winding axis Z held therebetween.

Furthermore, in the bundling step, when the electrode assembly 2 is viewed from the other side in the direction of the winding axis to one side, the positive electrode current collecting substrates 11 of the positive electrodes 10 are bundled along the bent end portions 13 of the negative electrodes 20 extending straightly with the winding axis Z held therebetween, thereby forming two bundle portions 14 with the winding axis Z held therebetween.

Moreover, in the bundling step, the current collecting substrates are bundled at the bending direction side of the current collecting substrate from the center of the thickness of the extension portion 15, thereby forming the bundle portion 14.

As a method of bundling the current collecting substrates, for example, an ultrasonic welding method or a laser welding method is employed.

In the accommodating step, for example, the electrode assembly 2 produced by the winding and the electrolyte solution 5 are accommodated in the case 80.

Specifically, in the produced electrode assembly 2, the current collector 9 is attached to each of the bundle portion 14 formed by the positive electrode current collecting substrate 11 and the bundle portion 14 formed by the negative electrode current collecting substrate 21. Next, the electrode assembly 2 and the current collector 9 attached to the electrode assembly 2 are disposed inside the case body 81 of the case 80. When there are a plurality of electrode assemblies 2, for example, the current collectors 9 of the electrode assembly are electrically connected to each other in parallel and are disposed inside the case body 81. Then, the external terminal 61 in the external gasket 7 attached to the cover plate 82 is connected to the current collector 9 by caulking of a rivet or welding and then the cover plate 82 is attached to the case body 81.

Subsequently, the electrolyte solution 5 is injected in the case 80 from a liquid injection hole provided in the case 80. Then, the liquid injection hole is sealed.

Thus, it is possible to manufacture the nonaqueous electrolyte secondary battery 1 as the energy storage device having the electrode assembly 2 formed by the winding.

In the case of manufacturing the energy storage device 1 in the specific example illustrated in FIGS. 12 to 15, for example, the wide positive electrode plate is cut by the cutting in the cutting step to form the current collecting tab 11a protruding partially from the positive electrode current collecting substrate 11, thereby producing the positive electrode 10. Similarly, the wide negative electrode plate is cut to form the current collecting tab 21a protruding partially from the negative electrode current collecting substrate 21, thereby producing the negative electrode 20.

In the case of manufacturing the energy storage device 1 in the specific example illustrated in FIGS. 12 to 15, the plurality of positive electrodes 10 and the plurality of negative electrodes 20 are alternately layered one by one in the electrode assembly producing step and the separator 3 is disposed between the positive electrode 10 and the negative electrode 20. At this time, the bending direction of the positive electrode current collecting substrate 11 at the bent end portion 13 of the positive electrode 10 is aligned. Similarly, the bending direction of the negative electrode current collecting substrate 21 at the bent end portion 13 of the negative electrode 20 is aligned.

Figure 12:
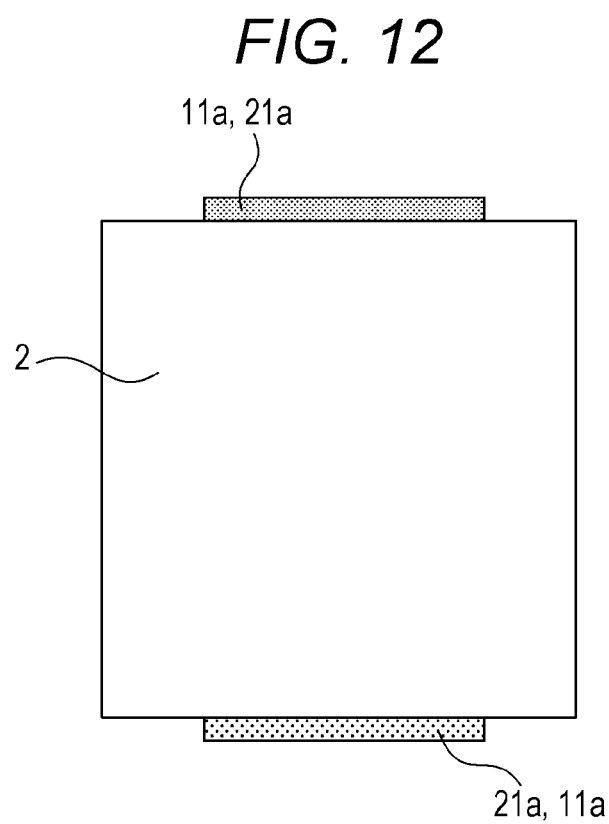
FIG. 12 is a view schematically illustrating a specific example of the electrode assembly when viewed from one side.
Figure 13:
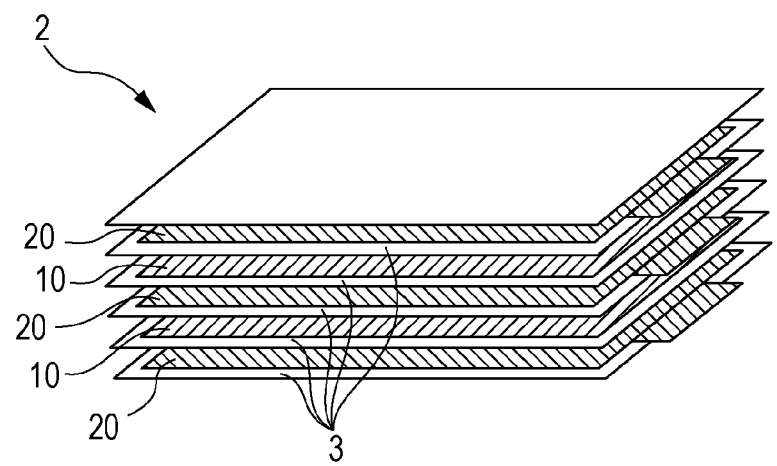
FIG. 13 is an exploded schematic diagram of a specific example of the electrode assembly.

Furthermore, in the electrode assembly producing step, for example, as illustrated in FIG. 12, the current collecting tab 11a of the positive electrode and the current collecting tab 21a of the negative electrode are respectively disposed along opposite sides of the electrode assembly 2 having substantially a rectangular shape.

In the case of manufacturing the energy storage device 1 in the specific example illustrated in FIGS. 12 to 15, for example, the current collecting tabs 11a of the positive electrodes are bundled to each other at the bending direction side of the negative electrode current collecting substrate 21 from the center of the thickness of the extension portion 15 in the bundling step, thereby forming the bundle portion 14. Similarly, the current collecting tabs 21a of the negative electrodes are bundled to each other at the bending direction side of the positive electrode current collecting substrate 11 from the center of the thickness of the extension portion 15, thereby forming the bundle portion 14. For example, the position where the current collecting tabs 11a of the positive electrodes are bundled to each other is opposite to the position where the current collecting tabs 21a of the negative electrodes are bundled to each other, with respect to the central portion of the electrode assembly 2.

In the case of manufacturing the energy storage device 1 in the specific example illustrated in FIGS. 12 to 15, for example, the electrode assembly 2 and the electrolyte solution are accommodated in the case 80 in the accommodating step. In addition, the flat terminal 65 is connected to the electrode assembly 2 by the welding of the outer portion of the bundle portion 14 and the flat terminal 65.

Specifically, the flange portions 85b of the above-described case pieces 85 are joined to each other, and thus the electrode assembly 2 is disposed in the case 80. At this time, the previously prepared electrolyte solution is accommodated in the case 80. At this time, the flat terminal 65a for the positive electrode and the bundle portion 14 on the positive electrode side are connected to each other, and the flat terminal 65b for the negative electrode and the bundle portion 14 on the negative electrode are connected to each other. In addition, at this time, the flat terminal 65a for the positive electrode and the flat terminal 65b for the negative electrode are partially disposed outside the case 80, respectively.

Thus, it is possible to manufacture the energy storage device 1 in the specific example illustrated in FIGS. 12 to 15.

The energy storage device of the present invention is not limited to the above embodiment, and various changes and modifications may be naturally made without departing from the scope and sprit of the present invention. For example, a configuration of another embodiment can be added to a configuration of an embodiment or a part of the configuration of an embodiment can be replaced by the configuration of another embodiment. Moreover, a part of the configuration of an embodiment can be removed.

Further, the above embodiment describes the case where the energy storage device is used as the chargeable/dischargeable nonaqueous electrolyte secondary battery (for example, lithium ion secondary battery), but the type and size (capacity) of the energy storage device are arbitrary. In addition, the above embodiment describes the lithium ion secondary battery as an example of the energy storage device, but is not limited thereto. For example, the invention is applicable to primary batteries or energy storage devices of capacitor such as an electric double layer capacitor in addition to various secondary batteries.

What is claimed is:

1. An energy storage device comprising:
   an electrode assembly that includes a sheet-like first electrode and a sheet-like second electrode, the first electrode and the second electrode being alternately layered and being wound together,
   wherein each of the first electrode and the second electrode includes a sheet-like current collecting substrate,
   the current collecting substrate of the first electrode is bent in a layered direction in at least a part of an end portion of the first electrode,
   the electrode assembly includes first and second extension portions formed in such a manner that the current collecting substrate of the second electrode extends outward more than the end portion of the first electrode,
   the first extension portion includes a first bundle portion formed by bundling the current collecting substrate of the second electrode at a leading end side in an extending direction of the first extension portion,
   the second extension portion includes a second bundle portion formed by bundling the current collecting substrate of the second electrode at a leading end side in an extending direction of the second extension portion,
   the first bundle portion is disposed opposite to the second bundle portion with respect to a winding axis of the electrode assembly,
   a central position in the layered direction of the first bundle portion is shifted from a center in the layered direction of the first extension portion toward the winding axis in the layered direction,
   a central position in the layered direction of the second bundle portion is shifted from a center in the layered direction of the second extension portion toward the winding axis in the layered direction,
   wherein the first electrode includes an active material layer which is disposed on the current collecting substrate of the first electrode, and
   wherein the current collecting substrate of the first electrode protrudes outward from the active material layer in the end portion of the first electrode.

2. The energy storage device according to claim 1, wherein, in a cross sectional view, the first electrode includes first bent end portions, at which the current collecting substrate of the first electrode is bent in the layered direction, in at least a part of the end portion of the first electrode, in a cross sectional view, the second electrode includes second bent end portions, at which the current collecting substrate of the second electrode is bent in the layered direction, in at least a part of an end portion of the second electrode which is formed at an end of the electrode assembly which is opposite the end portion of the first electrode, the first bent end portions are disposed to align the bending direction of the current collecting substrate of the first electrode, at one side of the winding axis of the electrode assembly, and the second bent end portions are disposed to align the bending direction of the current collecting substrate of the second electrode, at the other side of the winding axis of the electrode assembly.

3. The energy storage device according to claim 2, wherein the first bent end portions are disposed to align the bending direction of the current collecting substrate of the first electrode toward the winding axis, and the second bent end portions are disposed to align the bending direction of the current collecting substrate of the second electrode toward the winding axis.

4. The energy storage device according to claim 2, wherein a bent width of the first bent end portions is in a range from greater than 0 μm to 100 μm.

5. The energy storage device according to claim 1, further comprising:

a first current collector connected to the first bundle portion; and a second current collector connected to the second bundle portion.

6. The energy storage device according to claim 1, wherein the current collecting substrate of the first electrode comprises one of aluminum, titanium, stainless steel, and nickel, baked carbon and a conductive polymer.

7. The energy storage device according to claim 1, a thickness of the current collecting substrate of the first electrode is in a range from 5 μm to 50 μm.

8. The energy storage device according to claim 1, wherein the active material layer of the first electrode comprises a first active material layer, and the second electrode comprises a second active material layer, wherein an area of the second active material layer is greater than an area of the first active material layer, and wherein an end edge of the second active material layer protrudes outward more than an end edge of the first active material layer.

9. The energy storage device according to claim 1, further comprising:

a separator formed between the first electrode and the second electrode, the separator comprising one of a polyolefin-based resin, a polyester-based resin and a fluorine-based resin.

10. The energy storage device according to claim 1, wherein the first and second bundle portions are aligned in the layered direction.

11. The energy storage device according to claim 1, wherein the first bundle portion is disposed within a thickness of the first extension portion in the layered direction, and the second bundle portion is disposed within a thickness of the second extension portion in the layered direction.

12. The energy storage device according to claim 1, wherein the current collecting substrate of the second electrode is bent toward one side in a layered direction in at least a part of an end portion of the second electrode, the electrode assembly includes third and fourth extension portions formed in such a manner that the current collecting substrate of the first electrode extends outward more than the end portion of the second electrode, the third extension portion includes a third bundle portion formed by bundling the current collecting substrate of the first electrode at a leading end side in an extending direction of the third extension portion, the fourth extension portion includes a fourth bundle portion formed by bundling the current collecting substrate of the first electrode at a leading end side in an extending direction of the fourth extension portion, and the third bundle portion is disposed opposite to the fourth bundle portion with respect to a winding axis of the electrode assembly.

13. The energy storage device according to claim 12, wherein a central position in the layered direction of the third bundle portion is shifted from a center in the layered direction of the third extension portion toward the one side in the layered direction, and a central position in the layered direction of the fourth bundle portion is shifted from a center in the layered direction of the fourth extension portion toward the one side in the layered direction.

14. The energy storage device according to claim 12, wherein the third and fourth bundle portions are aligned in the layered direction.

15. An energy storage device comprising:

an electrode assembly that includes a sheet-like first electrode and a sheet-like second electrode, the first electrode and the second electrode being alternately layered and being wound together, wherein each of the first electrode and the second electrode includes a sheet-like current collecting substrate, the current collecting substrate of the first electrode is bent in a layered direction in at least a part of an end portion of the first electrode, the electrode assembly includes first and second extension portions formed in such a manner that the current collecting substrate of the second electrode extends outward more than the end portion of the first electrode, the first extension portion includes a first bundle portion formed by bundling the current collecting substrate of the second electrode at a leading end side in an extending direction of the first extension portion, the second extension portion includes a second bundle portion formed by bundling the current collecting substrate of the second electrode at a leading end side in an extending direction of the second extension portion, the first bundle portion is disposed opposite to the second bundle portion with respect to a winding axis of the electrode assembly, a central position in the layered direction of the first bundle portion is shifted from a center in the layered direction of the first extension portion toward the winding axis in the layered direction, and a central position in the layered direction of the second bundle portion is shifted from a center in the layered direction of the second extension portion toward the winding axis in the layered direction, wherein the first electrode includes an active material layer which is disposed on the current collecting substrate of the first electrode, the active material layer in the end portion of the first electrode being substantially flat in the extending direction of the first and second extension portions, and wherein the current collecting substrate of the first electrode protrudes outward from the active material layer in the end portion of the first electrode.

16. The energy storage device according to claim 15, wherein, in a cross sectional view, the first electrode includes first bent end portions, at which the current collecting substrate of the first electrode is bent in the layered direction, in at least a part of the end portion of the first electrode, and wherein in a cross sectional view, the second electrode includes second bent end portions, at which the current collecting substrate of the second electrode is bent in the layered direction, in at least a part of an end portion of the second electrode which is formed at an end of the electrode assembly which is opposite the end portion of the first electrode.

17. The energy storage device according to claim 16, wherein the first bent end portions are disposed to align the bending direction of the current collecting substrate of the first electrode, at one side of the winding axis of the electrode assembly, and wherein the second bent end portions are disposed to align the bending direction of the current collecting substrate of the second electrode, at the other side of the winding axis of the electrode assembly.

18. An energy storage device comprising:

an electrode assembly that includes a sheet-like first electrode and a sheet-like second electrode, the first electrode and the second electrode being alternately layered, wherein each of the first electrode and the second electrode includes a sheet-like current collecting substrate, a first active material layer formed on the sheet-like current collecting substrate, and a second active material layer formed on a side of the sheet-like current collecting substrate which is opposite the first active material layer, the current collecting substrate of the first electrode is bent toward one side in a layered direction in at least a part of an end portion of the first electrode, such that a thickness of the first active material layer at the end portion is greater than a thickness of the second active material layer at the end portion, the electrode assembly includes an extension portion formed in such a manner that the current collecting substrate of the second electrode extends outward more than the end portion of the first electrode, the extension portion includes a bundle portion formed by bundling the current collecting substrate of the second electrode at a leading end side in an extending direction of the extension portion, and a central position in the layered direction of the bundle portion is shifted from a center in the layered direction of the extension portion toward the one side in the layered direction, wherein the current collecting substrate of the first electrode protrudes outward from the first active material layer in the end portion of the first electrode.

* * * * *